United States Patent [19]

Peterson

[11] Patent Number: 5,798,064
[45] Date of Patent: Aug. 25, 1998

[54] PROCESS AND APPARATUS FOR FABRICATION OF FLEXIBLE FOAM

[76] Inventor: Gregory P. Peterson, 3647 Sommersworth Ln., Indianapolis, Ind. 46228

[21] Appl. No.: 772,763

[22] Filed: Dec. 23, 1996

[51] Int. Cl.[6] .................. B29C 44/24; B29C 44/46
[52] U.S. Cl. .................. 264/46.3; 264/46.5; 425/75; 425/144; 425/335; 425/367; 425/817 C
[58] Field of Search .................. 264/46.3, 46.5; 425/4 C, 75, 335, 363, 367, 144, 817 C

[56] References Cited

U.S. PATENT DOCUMENTS

| | | | |
|---|---|---|---|
| 2,872,965 | 2/1959 | Sisson | 264/46.3 |
| 3,065,500 | 11/1962 | Berner | 425/4 C |
| 3,174,887 | 3/1965 | Voelker | 425/4 C |
| 3,526,556 | 9/1970 | Berner | 425/4 C |
| 3,686,047 | 8/1972 | Miller | 264/46.3 |
| 3,832,106 | 8/1974 | Rivat-Lahousse | 425/4 C |
| 3,867,494 | 2/1975 | Rood et al. | 264/46.3 |
| 3,917,439 | 11/1975 | Yovanovich | 425/4 C |
| 3,929,947 | 12/1975 | Schwartz et al. | 264/46.3 |
| 4,076,781 | 2/1978 | Clay et al. | 264/46.7 |
| 4,275,172 | 6/1981 | Barth et al. | 264/46.5 |
| 4,518,550 | 5/1985 | Miettinen et al. | 425/367 |
| 4,571,319 | 2/1986 | Baluch et al. | 264/53 |
| 4,600,637 | 7/1986 | Kafka et al. | 425/817 C |
| 4,783,287 | 11/1988 | Eichberger et al. | 264/46.3 |
| 4,906,672 | 3/1990 | Stone et al. | 264/50 |
| 5,254,301 | 10/1993 | Session et al. | 264/46.3 |
| 5,614,135 | 3/1997 | Maleczek | 264/45.1 |

FOREIGN PATENT DOCUMENTS

| | | | |
|---|---|---|---|
| 1 176 834 | 5/1958 | Germany | 264/46.3 |
| 58-1535 | 1/1983 | Japan | 264/46.3 |

*Primary Examiner*—Allan R. Kuhns
*Attorney, Agent, or Firm*—Huntley & Associates

[57] ABSTRACT

Method and apparatus for continuously forming thin-gauge flexible foam sheeting by controlling the rise of an expanding foam-forming mixture until the reaction is substantially complete.

33 Claims, 5 Drawing Sheets

PROCESS AND APPARATUS FOR FABRICATION OF FLEXIBLE FOAM

BACKGROUND OF THE INVENTION

Flexible thin-gauge foam sheets have been prepared by a wide variety of methods and used in a wide variety of applications, such as cushioning layers in footwear, upholstery, and insulation. Previously, thin-gauge foam sheets were made by slicing a sheet of the desired thickness from a bun or loaf of foam that had been allowed to freely expand. This method resulted in waste due to the irregularities in the shape of the bun or loaf, especially at its top, and resulted in undesirable surface characteristics. In addition, the cell structure of the foam varied because lower portions were under greater pressure and thus the cells in these portions were compressed and differed in their size and configuration from those towards the top of the bun. Accordingly, smooth faced foam sheets with consistent cell structure cannot be created by this method. Other methods of foam preparation involved formation of foam sheets in final product form in closed molds. Although the molding method may provide a means for forming a foam sheet having a smooth skin, it does not provide a means of producing foam sheets with consistent cell structure and size throughout, because the pressure from the expanding foam causes cells to rupture and deform as the expanding foam is restricted within the mold.

The previous methods of forming flexible thin-gauge foam sheets do not provide a means for forming a sheet having consistent cell structure and size throughout the foam, and a smooth face or skin on the exterior of the foam sheet. Accordingly, a need exists for a new method of forming a flexible thin-gauge foam sheet.

SUMMARY OF THE INVENTION

The present invention provides a process for the formation of flexible thin-gauge foam sheets having improved consistency of composition, cell structure, and cell size, and other characteristics, and an apparatus for forming such foam sheets. The foam sheets resulting from the present invention exhibit low or high density closed cells with uniform cell structure and size throughout the foamed part and a smooth skin.

Specifically, the instant invention provides a continuous process for forming a flexible thin-gauge foam comprising: supplying foam-forming components, at controlled temperatures and moisture levels, to discrete storage vessels; adjusting or maintaining the temperature and moisture level of each foam-forming component within its storage vessel; supplying the individual components to mixing and dispensing means; admixing the foam-forming components to initiate a reaction; casting the resulting foam-forming mixture onto a continuously conveyed first facing material and applying a continuously conveyed second facing material onto the foam-forming mixture, both facing materials being conveyed at the same rate to form a continuous sandwich; dispersing the cast mixture evenly between the facing materials; conveying the sandwich through a substantially vertical gap formed between a multiplicity of upper and lower rollers, the vertical gap between each upper and lower roller being substantially the same throughout the multiplicity, thereby restricting the rise of the reacting foam-forming mixture and defining the thickness of the resulting foam without fully restricting the expansion of the mixture; and adjusting the speed and temperature at which the sandwich is conveyed through the vertical gap between the rollers to assure that the reaction is substantially complete before the sandwich has passed through the rollers.

The present invention further provides an apparatus for forming a flexible thin-gauge foam comprising: means for supplying foam-forming components, at controlled temperatures and moisture levels, to discrete storage vessels; means for adjusting or maintaining the temperature and moisture level of each foam-forming component within its storage vessel; means for supplying the individual components to mixing and dispensing means; means for admixing the foam-forming components to initiate a reaction; means for casting the resulting foam-forming mixture onto a continuously conveyed first facing material and applying a continuously conveyed second facing material onto the foam-forming mixture, both facing materials being conveyed at the same rate to form a continuous sandwich; means for evenly dispersing the cast mixture between the facing materials; means for restricting the rise of the sandwich by conveying it through a substantially vertical gap formed between a multiplicity of upper and lower rollers, the vertical gap between each upper and lower roller being substantially the same throughout the multiplicity, thereby restricting the rise of the reacting foam-forming mixture and defining the thickness of the resulting foam without fully restricting the expansion of the mixture; and means for adjusting the speed and temperature at which the sandwich is conveyed through the vertical gap between the rollers to assure that the reaction is substantially complete before the sandwich has passed through the rollers.

BRIEF DESCRIPTION OF THE DRAWINGS

FIG. 7 is a side elevational view of an alternate embodiment of an apparatus of the invention.

DETAILED DESCRIPTION OF THE INVENTION

The process and apparatus of the present invention will be more fully understood in view of the following description and the drawings. Variations and modifications of both the process and the apparatus of the present invention are dependent on the raw materials and equipment used, environmental conditions, as well as the desired final product. Accordingly, modifications and variations of the process and apparatus can be made without departing from the principles of the invention, as will be evident to those skilled in the art.

One embodiment of the process of the present invention is described below, and the description of the process contains references to the Figures, which show three possible embodiments of an apparatus of the present invention. The apparatus of the invention typically comprises discrete storage vessels 11, each vessel further comprising means 12 for adjusting and controlling the temperature and humidity therein, means 13 for supplying individual foam-forming components to the vessels and to a means for admixing the components, means 14 for admixing the components, means 15 for casting the resulting foam-forming mixture 3 between a first facing material 31 and second facing material 32 to form a sandwich 30, means 33 for dispersing the mixture between the facing materials, means 40 for restricting the rise of the reacting foam-forming sandwich, and means (not shown) for adjusting the speed and temperature at which the sandwich is conveyed through the means for restricting its rise. The means for restricting the rise of the sandwich further comprises a multiplicity of upper rollers 42 and lower rollers 43 which form a substantially vertical gap 41 through which the foam-forming sandwich is conveyed. The means for restricting the rise of the sandwich further comprises an oven 44 which contains the rollers, and a conveyor system having adjustable speed, and can further comprise a curing oven 50. The apparatus typically further comprises additional ovens and means 60 for removing one or both facing materials. In addition, the finished foam sheets 4 can be cut into individual sheets 5 by cutting means 6. The apparatus is also preferably equipped with trimming means 70 for removing excess foam and producing a final product of uniform dimensions.

According to the process of the present invention, individual foam-forming components are introduced into discrete storage vessels 11. The individual foam-forming components can comprise a combination of chemicals and even additives such as color or tint, however, the combination itself will not react to form foam until it is mixed with the other foam-forming component or components. Each discrete storage vessel 11 comprises a means 12 for monitoring, adjusting, and maintaining the temperature and humidity therein, and thus provides a means for adjusting and maintaining the temperature and humidity of the foam-forming component therein. The temperature and humidity of each foam-forming component are adjusted within each storage vessel to a level that is determined based on the specific components, the desired final product, the specific apparatus being used, and the presence or absence of any uncontrolled environmental conditions.

For example, given specific foam-forming components and a specific desired final product, the temperature and humidity within each storage vessel can be adjusted and maintained in order to control the timing of the reaction after the components are mixed, and to control the rate of the reaction. Although it is desirable to control the temperature and humidity of the individual components prior to their admixture and reaction, it is also important to control these factors as the components are mixed and while the mixture is reacting. A preferred embodiment of the process involves controlling the temperature and humidity throughout the process. It is also possible, especially in circumstances where the apparatus of the invention does not provide a means for controlling the environment at every stage, to compensate for this lack of total control by adjusting the pre-mix temperatures and humidity levels of the components to minimize the effects of heat and high humidity. Typically, after factors such as environmental conditions have been eliminated or accounted for, the conditions in the storage vessels are then adjusted according to the desired final product and any applicable process limitations associated with the apparatus being used.

Preferably, the need to compensate for environmental conditions is reduced or eliminated when the process is substantially completed within a controlled environment. The difference between the preferred process and an embodiment wherein portions of the process are completed without environmental control involve the mixing and casting stages, which in less sophisticated systems occurs in an open, uncontrolled environment. For example, when the mixture is cast between the facing materials, it is exposed to the environment. In such embodiments, the process involves compensation for the exposure of the foam-forming components, which may absorb moisture while exposed. To avoid having to compensate for these conditions, the mixing and casting are completed in a controlled environment.

Controlling the temperature and moisture level of the components is important for many reasons. The temperature of the components will affect their rate of reaction when they are mixed, and because the process of the present invention requires that expansion of the reacting foam-forming mixture be vertically restricted until the reaction is substantially complete, it is important to determine the amount of time necessary for the reaction of a given amount of foam-forming mixture to be substantially complete. By knowing the amount of time necessary to substantially complete the foam-forming reaction, the speed at which the foam-forming mixture is conveyed through the apparatus of the present invention can be determined so that the reaction is substantially complete while the expansion of the reacting mixture is being restrained. Because any embodiment of an apparatus of the invention is necessarily finite in length, there are constraints on the amount of time available for reaction within the portion of the apparatus which restrict the rise of the reacting mixture. Accordingly, temperature and humidity affect the reaction rate, and by controlling these factors prior to and during the reaction, the process of the present invention provides a means for assuring that the foam-forming reaction is substantially complete before the mixture has passed through the rise restraining rollers.

In addition, and more specific to the preferred foam-forming components, water is typically involved in the reaction of the foam-forming components, either as a reactant or a blowing agent. Accordingly, if the individual foam-forming components are stored in humid conditions or are otherwise stored in a manner that makes them vulnerable to fluctuating environmental conditions, they can absorb water and thus affect the rate of reaction, as well as affecting the quality of the finished foam. Accordingly, the temperature and moisture of the foam-forming components should be controlled prior to mixture and initiation of the reaction. The particular temperature and moisture at which the components are maintained will necessarily vary with the particular components and apparatus used, as well as with the environmental conditions in embodiments where they are permitted to have an effect. Because it is inefficient to constantly adjust the temperature and moisture of the components to adjust for changing environmental conditions, it is preferable to eliminate these conditions by controlling the environment at every stage of the process. Preferably, the apparatus of the present invention will provide a means of completing every step of the process within a controlled environment. Such means include an environmentally controlled room for the apparatus of the invention, not shown. Accordingly, given typical conditions, the components should be maintained at about room temperature prior to mixture, that is, about 68° F. plus or minus 2°, and maintained at a relative humidity of less than about 50%.

Generally, the specific foam-forming components to be used depend upon a variety of factors such as the type of apparatus involved in the process and the resulting limitations of the amount of time available for reaction within the apparatus, health and safety considerations such as ventilation and circulation of air, and the desired final product. In addition, as discussed above, less sophisticated embodiments of the process or apparatus of the invention may require that action be taken to account for environmental conditions. Such action may include choosing the specific foam-forming component to be used given the environmental conditions. Similar considerations affecting the choice of foam-forming components involve the suitability of the components to the process of the invention. For example, some foam-forming components or additives may be solid at room temperature, or may require substantial heating before they become liquid, and thus may not be suitable for every embodiment of the process or apparatus of the present invention. Other factors which affect the selection of foam-forming components include the desired physical characteristics of the final product, such as tensile strength, elongation and tear resistance, resistance to the effects of humidity and moisture, and resistance to oxidation and UV degradation. For example, chain extenders can be added for overall product toughness. Accordingly, a wide variety of foam-forming materials can be used in the present invention. Typically, the foams prepared according to the instant process and using the present apparatus are based on polymers such as polyurethanes and polysilicones.

Polyurethanes are typically prepared by the reaction of a polyisocyanate with at least one second reactant having hydroxyl groups, such as, for example, polyethers, caster oil and simple glycols. In addition, other reactive groups can also be present, such as amino and carboxyl. Accordingly, a typical polyurethane can contain, in addition to urethane groups, aliphatic and aromatic hydrocarbon, ester, ether, amid, and urea groups. In the production of the polyurethanes, the di- or poly- functional hydroxyl compounds are brought together with the polyfunctional isocyanates under reaction conditions. Typical of the isocyanates which can be used are diisocyanates such as hexamethylene diisocyanate as well as tetra- and octamethylene diisocyanates. Other glycols and diisocyanates which can be used are described in detail in Catlin U.S. Pat. No. 2,284,637. Of these materials, particularly satisfactory flexible thin-gauge foams can be prepared from isocyanates based on toluene diisocyanate and polyether polyol such as that commercially available as Polyol HS-100 from Arco chemicals.

Other polymer systems which can be used to prepare foams in accordance with the present invention include polysilicones. Generally, silicones may be used in applications requiring excellent weathering, especially for applications to be used in wet or mildew prone areas, or where the foam will be subjected to wider temperature ranges. The specific polymers used for such polysilicones can similarly vary widely. In general, polysilicones are cross-linked polysiloxane systems, and the crosslinking components are usually introduced as trifunctional silanes in the first stage of manufacture. For example, a solution of chloro- and phenyl-substituted silanes in organic solvent can be hydrolyzed to form a complex copolymer mixture, which remains in solution. The resulting aqueous hydrochloric acid is separated, and the resulting resin is washed and heated in the presence of a mild condensation catalyst to bring the resin to the desired viscosity and state of cure. The properties of the finished silicone resin will depend on the choice of chlorosilanes, the degree of cure, and the processing conditions. The silicone polymers used for the preparation of foams generally have silanol end groups, and can be effectively cured by reactions involving acetoxysilanes. Foamed polymers can also be prepared by the reaction of silanol-terminated silicone polymers with hydride-functional solozanes, in which hydrogen gas is generated as a by-product. In general, the polymers used have a molecular weight of about from 200 to 2,000. Particularly preferred silicone polymers used for foam preparation are polydimethylsiloxanes, such as those commercially available from the General Electric Corporation.

In the process of the present invention, the individual foam-forming components are supplied to a mixing means 14 and admixed therein to initiate a reaction. The admixed components are then supplied to a dispensing means 15. In the embodiment of the apparatus shown in the Figures, the mixing means and dispensing means are combined. Although a preferred option, the temperature within the mixing and dispensing means can be adjusted, depending on the reaction temperature of the polymer system selected, to further control the time and rate of the reaction. Accordingly, the reaction will begin upon mixture of the components. For the preferred polyurethane foam materials, a temperature of at least about 25°, and up to about 100° F., is generally preferred to initiate the reaction of the components.

After the components are admixed, the resulting foam-forming mixture 3 is cast onto a continuously conveyed first facing material 31, after which a second facing material 32 is applied to the foam-forming mixture, forming a sandwich 30. While the cast mixture will typically react and cure at room temperature, some urethane and silicone foams are better cured at 350° F. In addition, the preparation of a light stable (aliphatic) foam requires temperatures of about 420° F. to cure properly and thus achieve the full potential for physical properties. According to the process of the present invention, the mixing of the foam-forming components and the casting of the foam-forming mixture are completed within a closed environment, which is controlled and maintained at levels appropriate to the process and desired final product. The Figures do not show, for clarity, a means to control the environment, however, the entire apparatus of the invention can be within an environmentally controlled room or chamber.

The foam-forming mixture can conveniently be cast by continuously extruding a stream of the foam-forming mixture through a dispensing means which continuously moves from side-to-side, perpendicular to the direction the facing materials are being continuously conveyed. To ensure that the foam-forming mixture is evenly distributed between the facing sheets, the sandwich is conveyed through a dispersing means 33 which squeezes the sandwich and evenly distributes the mixture between the facing sheets. Typically, the dispersing means comprises at least one metering roller and a pour plate, at least one pair of opposing metering rollers, or a knife over one metering roller. The gap between the metering roller and the pour plate, between the pair of metering rollers, or between the knife and the metering roller is narrow enough to evenly disperse the mixture between the sheets, and is generally narrower than the substantially vertical gap between the multiplicity of upper and lower rollers which restrict the rise of the reacting mixture and define the thickness of the resulting foam sheets. The multiplicity of upper and lower rollers, which restrict the rise of the foam-forming components, and the process of conveying the sandwich through them, is described below.

The time between the casting of the mixture and its dispersion should be limited because the reaction initiated by the admixture of the foam-forming components results in expansion of the mixture, and the reacting mixture should be evenly dispersed before substantial change in viscosity occurs. Accordingly, it is preferred that the cast mixture be dispersed between the facing sheets immediately after casting.

To form the sandwich, a wide variety of facing materials can be used, including paper, polymeric films such as those biaxially oriented polyester films commercially available from DuPont as Mylar polyester, vinyl polymer films, flexible thin-gauge foam formed according to the present invention, or other preformed sheets of flexible thin-gauge foam. Paper is preferred in applications where the facing material is removed from the foam sheets, and offers the additional advantage of being reusable and recyclable. For example, the continuously conveyed paper facing material can be continuously divorced from the finished foam sheets and continuously reintroduced as a facing material.

Returning again to the description of the process, the reacting foam-forming mixture of the sandwich expands, causing the sandwich to rise and the mixture therein to rise and spread. The vertical expansion or rise of the reacting mixture within the sandwich is restricted according to the present process and apparatus, when the sandwich is conveyed through a substantially vertical gap formed between a multiplicity of upper and lower rollers, the vertical gap 41 between each upper 42 and lower roller 43 being substantially the same, thereby restricting the rise of the reacting foam-forming mixture and determining the thickness of the resulting foam. While the sandwich is being conveyed between each pair of upper and lower rollers, the vertical expansion of the mixture is restricted while the horizontal expansion of the mixture is partially restricted in the direction the sandwich is being conveyed by the reacted foam ahead, and in the opposite direction by the continuous flow of new reacting mixture behind. Accordingly, the expanding mixture can flow laterally, perpendicular to the movement of the sandwich, where it can expand in a substantially unrestricted manner.

By allowing the reacting mixture to expand substantially free of restriction laterally in two directions, the process of the invention provides a means of forming foam with desirable qualities. The foam will be substantially uniform in width, the structure and size of the cells will also be substantially uniform, the integrity of the cells will not be destroyed, and the face on each side of the sheet will have the characteristics of the facing material uniformly. Uniform cell structure and size are important from an aesthetic standpoint, and also because the continuous sheet of foam will be consistent throughout segments of the sheet and among different segments. The ability to impart the qualities of the chosen facing material onto the skin of the sheet provides many aesthetic options, and allows for a smooth skinned sheet. The smooth skin of a foam sheet formed according to the present process also provides improved wear resistance and better slip than open foam. The smooth skin also permits one or both of the facing materials to be removed without affecting the integrity of the surface of the foam sheet, and thus provides an added advantage of permitting the facing sheets to be removed and reused.

Figure 1:
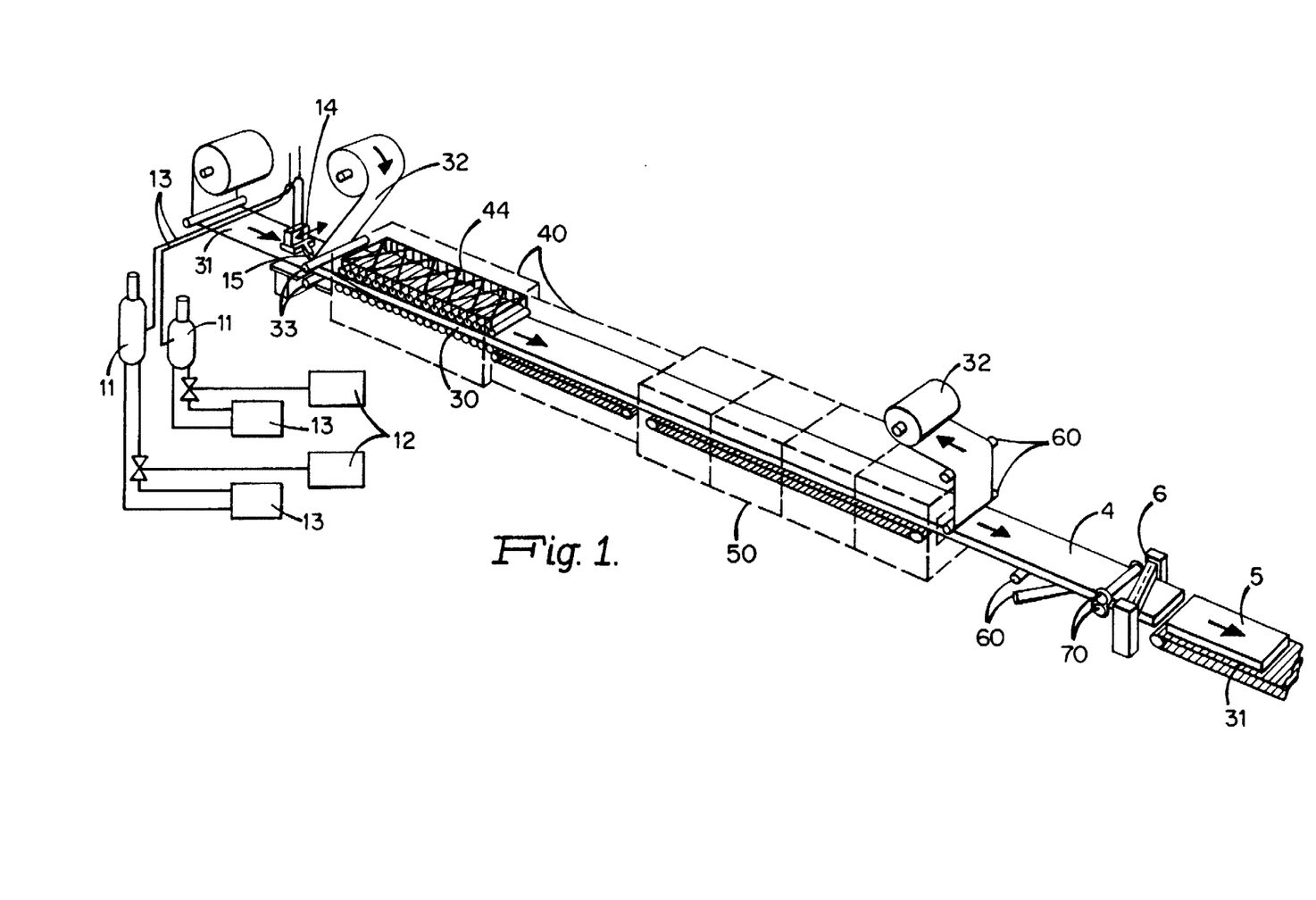
FIG. 1 is a schematic view of one embodiment of the apparatus of the present invention.
Figure 2:
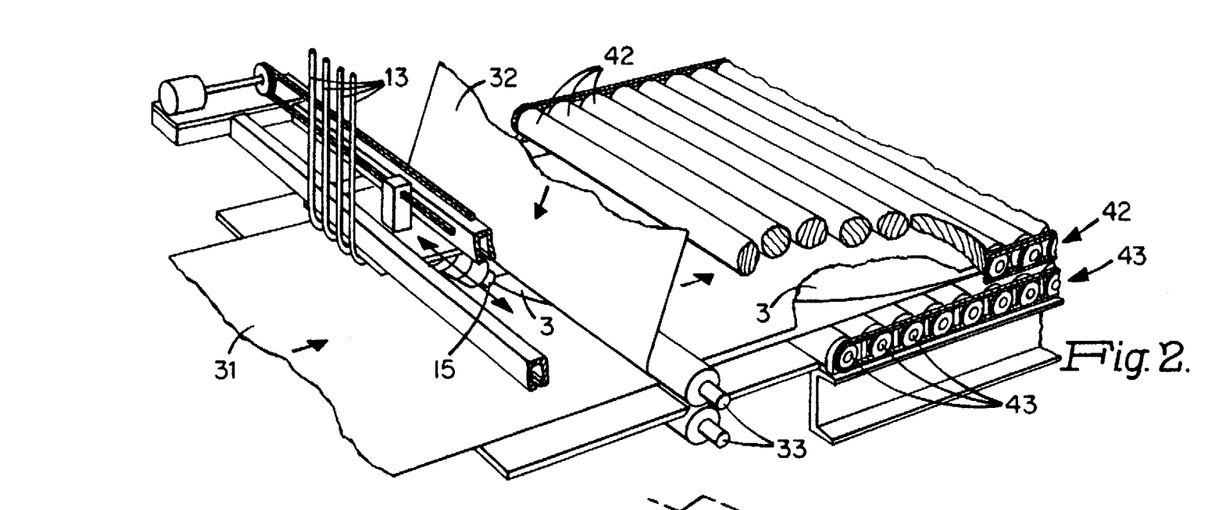
FIG. 2 is a side elevational view of a first portion of an apparatus of the present invention, partially broken away.
Figure 3:
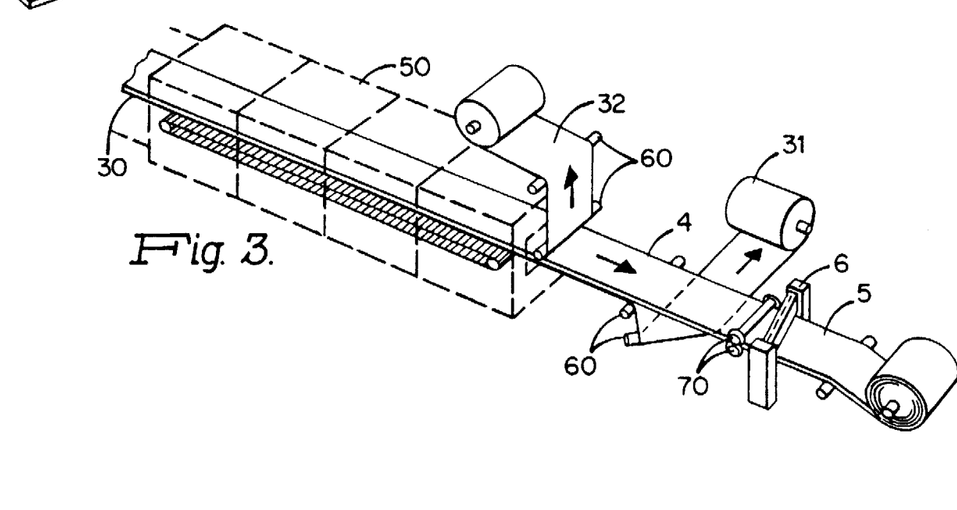
FIG. 3 is a side elevational view of a second portion of an apparatus of the invention.
Figures 4A, 4B, 4C:
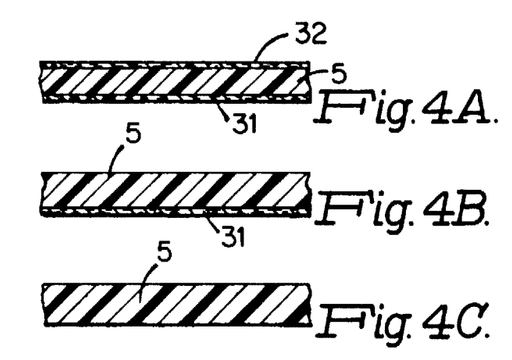
FIG. 4A, 4B, 4C, 4D, & 4E are cross sectional views of different flexible foam sheets formed according to the present invention.
Figure 4D:
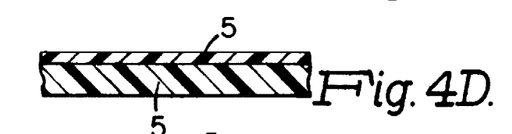
Figure 4E:
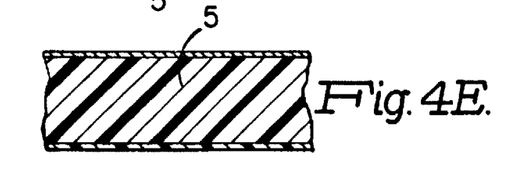

FIGS. 4A–4E show representative foams which can be formed according to the present invention. FIG. 4A shows a flexible thin-gauge foam having a first and second facing material. FIG. 4B shows a flexible thin-gauge foam having a first facing material. FIG. 4C shows a flexible thin-gauge foam having no facing material. FIG. 4D shows a flexible thin-gauge foam having another flexible thin-gauge foam as a first facing material. FIG. 4E shows a flexible thin-gauge foam wherein both facing materials have been removed to impart their surface characteristics onto both faces of the foam.

Although it is not necessary for the reaction to be complete before the sandwich is freed from the means for restricting its rise, any expansion that occurs after the sandwich is no longer restrained will occur in a uniform manner, and thus the relational dimensions of the foam sheet will not change relative to each other, even though the sandwich may continue to expand to some degree. The amount and extent of post-restriction expansion can be determined and accounted for. For example, a particular foam-forming mixture may react and expand for a period of time longer than the time during which its rise is restricted. Accordingly, the vertical gap between the pairs of rollers can be set, and the temperature during restriction can also be set, to account for the uniform expansion that will take place after the sheet exits the means for restricting its rise, so that the dimensions of the sheet will be those desired. The post-restriction expansion, because it is unrestricted, will occur uniformly, and thus the cell size and shape determined during the restriction of the rise may increase, but uniformly, and the relationship between the width of the sheet and its cell size will be unchanged.

Figure 6A:
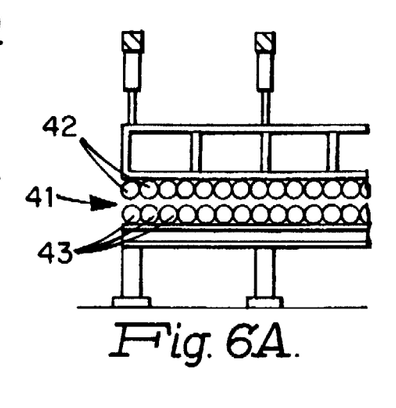
FIG. 6A is a side elevational view of FIG. 5, showing the adjustment of the upper and lower rollers to reduce the vertical gap between the rollers.
Figure 6B:
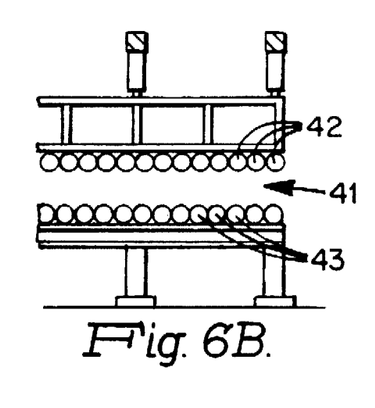
FIG. 6B is a side elevational view of FIG. 5, showing the adjustment of the upper and lower rollers to increase the vertical gap between the rollers.
Figure 8:
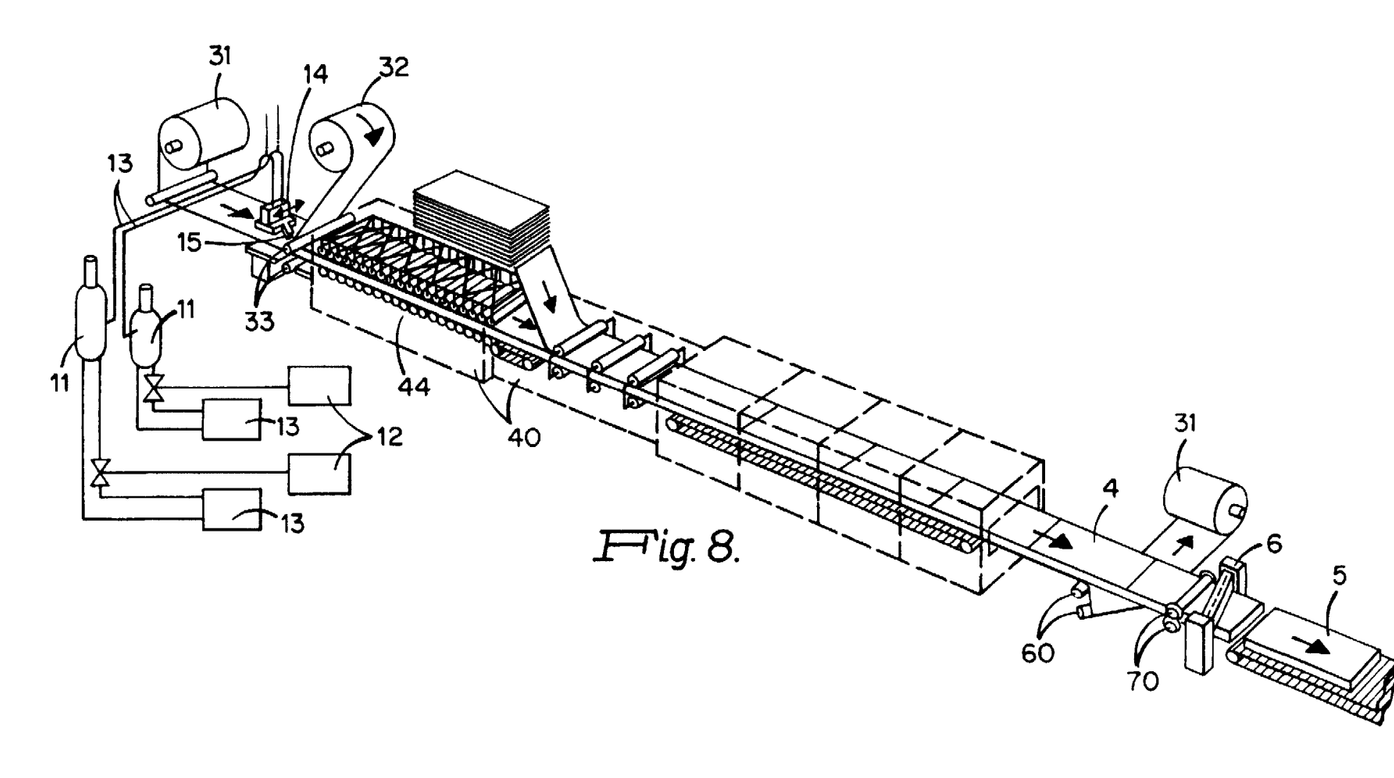
FIG. 8 is a side elevational view of a second alternate embodiment of an apparatus of the present invention.

In general, the portion of the apparatus of the invention wherein the expansion of the mixture is restricted can comprise at least of ten pairs of nip rollers. The vertical gap between each member of each upper and lower nip roller should be the same throughout, to provide for the most uniform final product. The vertical gap should be adjusted based on the desired final thickness of the foam, which, for the flexible, thin-gauged foams of the present invention will generally be about from 10 to 4,000 mils. FIGS. 6A & 6B show the vertical gap adjusted to produce foam of different thicknesses. Although complete uniformity of vertical gap is desirable, in general, the variation in the vertical gap between each upper and lower roller used will be less than about 10% of the gap thickness, preferably less than about 5%. It is also preferred that the horizontal spacing between each adjacent upper roller and the horizontal spacing between each adjacent lower roller are minimized, however, the horizontal spacing can necessarily vary with the speed at which the sandwich is transported through the rollers, with greater speeds reducing the time the sandwich is not in contact with the rollers, and thus permitting increased horizontal spacing. Because of practical constraints such as limitations of the length of the apparatus and limitation of the speed at which the sandwich can be conveyed, the horizontal spacing should similarly be minimized. In general, the horizontal spacing of the rollers should be no more than two times the diameter of the rollers, measured from the center of each roller, and the rollers should preferably be of substantially the same dimensions.

Figure 5:
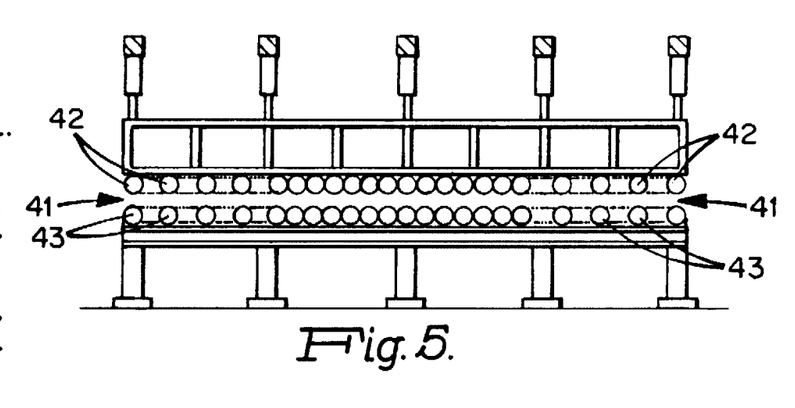
FIG. 5 is a cross sectional view of a means for restricting the rise of an expanding foam-forming mixture.

The apparatus provides a means for adjusting and controlling the speed at which the sandwich is conveyed through the restrained rise portion, and the temperature therein. Although these elements are not specifically shown in the Figures, the means for controlling the speed at which the sandwich is conveyed typically comprises an adjustable rate motor attached to a conveyor system which is operatively connected to the upper and lower rollers. The means for controlling the temperature within the restricted rise portion of the apparatus typically comprises an oven surrounding the rollers and conveyor system. A means is thus provided whereby the time during which the sandwich is within the restrained rise portion of the apparatus can be adjusted, and time of reaction can also be varied by adjusting the temperature within the apparatus. The ability to adjust these variables provides a means for assuring that the reaction is substantially complete before the sandwich has passed through the vertical gap between all of the rollers. As discussed above, the speed is dependent upon the amount of rollers and the horizontal spacing between the rollers, the particular foam-forming components, the dwell or time the mixture is maintained at the temperature, the heat exchange rate and related conduction, convection and air-flow within the apparatus, and the desired final product. FIG. 5 shows possible variations in the horizontal spacing between rollers.

The process and apparatus of the present invention can comprise further variations, including means for removing one or both facing sheets from the sandwich, recycling or continuously reusing one or both of the facing sheets, cutting the continuous sandwich to form individual sheets, or even using the finished foam sheet as one of the facing sheets and producing a two layer foam sheet. These variations are generally shown in FIGS. 1, 3, 7, & 8. The process and apparatus of the present invention thus provide an improved means of producing a new foam comprising two or more chemically bonded foam sheets having different physical properties. Such a new combination foam sheet is useful in many applications such as cushioning layers in crash pads and side bumpers in various transportation vehicles, and ergonomic cushioning and devices. In addition, the process and apparatus can be used to form various final products. For example, color, tint, or carbon black can be added to one or more of the individual foam-forming components to produce a colored foam. Carbon black can also be used as a filler. Preferably, the present polymeric foams are substantially unfilled. Specifically, in general, the final foam composition preferably contains less than about 10% of unreacted material.

The process of the present invention is further illustrated by the following specific example:

EXAMPLE:

Toluene Diisocyanate (TDI) is introduced into a first storage vessel at a temperature of 65° F. While the TDI is being introduced into the first storage vessel, it is blanketed with dry air having a dew point of −100° F. A second storage vessel contains Polyether Polyol HS-100 (commercially available from Arco Chemicals, Inc.). The Polyether Polyol HS-100 is stored at 45° F. and is also blanketed with dry air, so that the Polyol has a controlled moisture of 0.1%. A third storage vessel contains 0.35 parts by weight Silicone L-6202 (commercially available from Union Carbide) and 2.3 parts by weight of water. These components are also blanketed with dry air and stored at 65° F. A fourth storage vessel contains 0.35 parts by weight Silicone L-6202, 0.05 parts by weight of NIAX A-1 Catalyst, and 0.09 parts by weight Stannous Octoate. These components are stored in the fourth storage vessel at 65° and blanketed with dry air having a dew point of −100° F.

The components are then continuously metered from their respective storage vessels to a continuous mixing device. Specifically, 3,289 grams per minute ("gpm") from the first storage vessel, 11,238 gpm from the second storage vessel and 298 gpm from the third storage vessel, 55 gpm from the fourth storage vessel. The total flow is 14,880 gpm. Dry air is continuously introduced into the mixing device at a rate of 0.6 standard cubic feet per hour, and the resulting mixture is discharged onto a facing material of 70 pound silicone coated release paper. The resulting foam-forming mixture has a free rise density of about from 2.2 to 2.5 pounds per cubic foot when allowed to rise at room temperature. A top facing material is applied to the mixture and the resulting sandwich is passed between a dispersing means comprising two metering rolls set at a vertical gap of 0.039 inches. This gap assumes 0.008 inches provided for the silicone coated release paper, and 0.002 inches provided for the top facing material. The resulting foam-forming sandwich is made in a room with a dew point of less than about 35° F. and a temperature of about 68° F.

The sandwich is then conveyed into the means for restricting the rise of the sandwich. This portion of the apparatus can further comprise, in addition to the upper and lower rollers, an oven which can be set at 160° F. The foam-forming sandwich is conveyed into and through the restricted rise portion of the apparatus, where it is conveyed between multiple pairs of rollers set at a 1.010 inch vertical gap until the reaction is substantially complete. There are 46 pairs of upper and lower rollers with a horizontal spacing of 5.219 inches measured from the center of one roller to the center of an adjacent roller. The individual rollers have a diameter of 5.00 inches.

The sandwich is processed in the restricted rise portion of the apparatus at a line speed of 45 feet per minute, which provides a dwell time of 53 seconds within the restrained rise portion, and a total oven dwell time of 3 minutes, 13 seconds in the heated environment. The rise of the reacting mixture is thus restrained, and all expansion is channeled horizontally. After passing through the rollers, the sandwich is then conveyed to an additional oven for further curing of the reacted foam at temperatures of about from 200° to 250° F.

Thereafter, the release paper is removed from the foam, which has a density of 2 pounds per cubic foot and a thickness of 1.002 inches.

I claim:

1. A continuous process for forming a flexible thin-gauge foam comprising:

supplying foam-forming components, at controlled temperatures and moisture levels, to discrete storage vessels;

adjusting or maintaining the temperature and moisture level of each foam-forming component within its storage vessel;

supplying the individual components to mixing and dispensing means;

admixing the foam-forming components to initiate a reaction;

casting the resulting foam-forming mixture onto a continuously conveyed first facing material and applying a continuously conveyed second facing material onto the foam-forming mixture, both facing materials being conveyed at the same rate to form a continuous sandwich;

dispersing the cast mixture evenly between the facing materials;

conveying the sandwich through a substantially vertical gap formed between a multiplicity of upper and lower rollers, the vertical gap between each upper and lower roller being substantially the same throughout the multiplicity, thereby restricting the rise of the reacting foam-forming mixture and defining the thickness of the resulting foam without fully restricting the expansion of the mixture; and adjusting the speed and temperature at which the sandwich is conveyed through the vertical gap between the rollers to assure that the reaction is substantially complete before the sandwich has passed through the rollers.

2. A process of claim 1 wherein the foam-forming components within the storage vessels are each maintained at about room temperature and a relative humidity of less than about 50%.

3. A process of claim 2 wherein the foam-forming components within the storage vessels are each maintained at a temperature of about 68° F. plus or minus 2°.

4. A process of claim 1 wherein the foam-forming components comprise at least one polyisocyanate and at least one second reactant having hydroxyl groups.

5. A process of claim 1 wherein the foam-forming components comprise at least one polysiloxane.

6. A process of claim 1 wherein at least one of the facing materials is a flexible substrate.

7. A process of claim 6 wherein the flexible substrate is selected from the group consisting of urethane film, acrylic pressure sensitive adhesive film, biaxially oriented polyester film, and flexible thin-gauge foam.

8. A process of claim 7 wherein the biaxially oriented polyester film is reinforced and metallized.

9. A process of claim 6 wherein the flexible substrate is removable.

10. A process of claim 9 wherein the removable flexible substrate is selected from the group consisting of polyethylene terephthalate film, polypropylene film, and paper.

11. A process of claim 9 wherein the removable flexible substrate further comprises wax on the side upon which the foam-forming mixture is cast.

12. A process of claim 9 wherein the removable flexible substrate further comprises polypropylene on the side upon which the foam-forming mixture is cast.

13. A process of claim 9 wherein the removable flexible substrate further comprises silicone on the side upon which the foam-forming mixture is cast.

14. A process of claim 9 wherein the substrate is removed from the foam sheet.

15. A process of claim 9 wherein the substrate, after being removed from the foam sheet, is reused as a facing material.

16. A process of claim 1 wherein at least one of the facing materials is a continuous flexible thin-gauge foam sheet.

17. A process of claim 16 wherein a composite foam sheet is formed according to the process of the present invention.

18. A process of claim 1 wherein each of the multiplicity of rollers are of substantially the same dimensions.

19. A process of claim 1 wherein the horizontal space between each of the upper rollers is less than about twice the diameter of each upper rollers, measured from the center of one upper roller to the center of an adjacent upper roller, and the horizontal space between each of the lower rollers is less than about twice the diameter of each lower rollers, measured from the center of one upper roller to the center of an adjacent upper roller.

20. A process of claim 1 wherein the vertical gap between each upper and lower roller is about from 10 to 4,000 mils.

21. A process of claim 1 wherein the sandwich is passed through a substantially vertical gap formed between at least 10 pairs of upper and lower rollers.

22. A process of claim 1 wherein the temperature surrounding the sandwich is maintained at about from 100° to 300° F. as it is conveyed through the substantially vertical gap between the upper and lower rollers.

23. An apparatus for continuously forming a flexible thin-gauge foam comprising:

means for supplying foam-forming components, at controlled temperatures and moisture levels, to discrete storage vessels;

means for adjusting or maintaining the temperature and moisture level of each foam-forming component within its storage vessel;

means for supplying the individual components to mixing and dispensing means;

means for admixing the foam-forming components to initiate a reaction;

means for casting the resulting foam-forming mixture onto a continuously conveyed first facing material and applying a continuously conveyed second facing material onto the foam-forming mixture, both facing materials being conveyed at the same rate to form a continuous sandwich;

means for evenly dispersing the cast mixture between the facing materials;

means for restricting the rise of the sandwich by conveying it through a substantially vertical gap formed between a multiplicity of upper and lower rollers, the vertical gap between each upper and lower roller being substantially the same throughout the multiplicity, thereby restricting the rise of the reacting foam-forming mixture and defining the thickness of the resulting foam without fully restricting the expansion of the mixture; and means for adjusting the speed and temperature at which the sandwich is conveyed through the vertical gap between the rollers to assure that the reaction is substantially complete before the sandwich has passed through the rollers.

24. An apparatus of claim 23 comprising at least ten pairs of upper and lower rollers for restricting the rise of the foam-forming mixture.

25. An apparatus of claim 23 wherein the vertical gap between each upper and lower roller is about from 10 to 4,000 mils.

26. An apparatus of claim 23 wherein the means for supplying the individual foam-forming components to a mixing and dispensing means comprises metering pumps.

27. An apparatus of claim 23 wherein the means for admixing the foam-forming components comprises a dispersion head.

28. An apparatus of claim 23 wherein the means for casting the resulting foam-forming mixture comprises a laterally moveable dispersion head.

29. An apparatus of claim 23 wherein the means for casting the resulting foam-forming mixture comprises at least two dispersion heads.

30. An apparatus of claim 23 wherein the means for evenly dispersing the cast mixture between the facing materials comprises a pour plate covered by a flexible bottom substrate which is continuously pulled by conveyor means in a longitudinal direction, a top roller to assist in the even dispersion of the foam-forming mixture upon the bottom substrate, and a flexible top substrate interposed between the cast mixture and the top roller, and a means to convey the substrate layers and the foam-forming mixture.

31. An apparatus of claim 23 wherein the means for evenly dispersing the cast mixture between the facing materials comprises at least one pair of opposing rollers.

32. An apparatus of claim 23 wherein the means for evenly dispersing the cast mixture between the facing materials comprises a knife positioned over a roller to form a substantially vertical gap.

33. An apparatus of claim 23 wherein the means for restricting the rise of the sandwich comprises a system to convey the sandwich through a reaction area comprising a means for heating or otherwise catalyzing the reaction of the foam-forming mixture, a means for controlling the rise of the foam-forming mixture comprising a multiplicity of opposing upper and lower rollers positioned to restrain the rise of the reacting foam-forming mixture, wherein the vertical gap between each upper and lower roller is adjustable to permit various settings for various thicknesses of foam, and wherein the horizontal spacing between each upper roller is adjustable and the horizontal spacing between each lower roller is adjustable.

* * * * *

UNITED STATES PATENT AND TRADEMARK OFFICE
CERTIFICATE OF CORRECTION

PATENT NO. : 5,798,064
DATED : August 25, 1998
INVENTOR(S) : Gregory P. Peterson It is certified that error appears in the above-identified patent and that said Letters Patent is hereby corrected as shown below:

Title page, item [73], Assignee: should read --Cabot Safety Intermediate Corporation, Boston, Massachusetts--

Signed and Sealed this

Thirtieth Day of May, 2000

Attest:

Attesting Officer

Q. TODD DICKINSON

Director of Patents and Trademarks